US006143114A

United States Patent [19]

Propach

[11] Patent Number: 6,143,114

[45] Date of Patent: Nov. 7, 2000

[54] METHOD AND DEVICE FOR BANDING TEXTILE ARTICLES WITH LABELS

[75] Inventor: Hans-Walter Propach, Schelmahd, Germany

[73] Assignee: Wepamat Maschinenbau GmbH, Weilheim-Teck, Germany

[21] Appl. No.: 09/190,684

[22] Filed: Nov. 12, 1998

[30] Foreign Application Priority Data

Nov. 13, 1997 [DE] Germany ........................... 197 50 183

[51] Int. Cl.[7] ........................................ B32B 31/00

[52] U.S. Cl. .......................... 156/212; 156/217; 156/229; 156/475; 156/494; 156/556

[58] Field of Search ..................................... 156/196, 212, 156/217, 229, 443, 475, 494, 538, 539, 556

[56] References Cited

U.S. PATENT DOCUMENTS

| | | | |
|---|---|---|---|
| 5,275,674 | 1/1994 | Sayyadi | 156/73.1 |
| 5,425,826 | 6/1995 | Sayyadi et al. | 156/73.1 |

FOREIGN PATENT DOCUMENTS

| | | |
|---|---|---|
| 32 33 546 | 3/1984 | Germany . |
| 700312 | 11/1953 | United Kingdom . |
| WO 93/13986 | 7/1993 | WIPO . |

*Primary Examiner*—James Sells
*Attorney, Agent, or Firm*—Barry R. Lipsitz

[57] ABSTRACT

The invention proposes a method for banding textile articles with labels, comprising the steps of feeding the article into a receiving unit, holding the article in the receiving unit and stretching it in its longitudinal direction, feeding the label to the article, wrapping the label around the article and fixing the ends of the label. There is further proposed a device for banding a textile article with labels, where the article is initially fed into a receiving unit comprising gripper elements, that can be moved one relative to the other, for gripping the article by its two outer lengthwise ends and for stretching the article in its longitudinal direction. The device further comprises a label feeding unit for feeding a label in a direction perpendicular to the longitudinal direction of the article to a central area of the article, between its two ends, as well as a device for wrapping the label around the article and for fixing the ends of the label.

25 Claims, 2 Drawing Sheets

METHOD AND DEVICE FOR BANDING TEXTILE ARTICLES WITH LABELS

BACKGROUND OF THE INVENTION

The present invention relates to a method for banding textile articles with labels, comprising the steps of feeding the article into a receiving unit and holding it therein, applying a label, bringing the label in contact with the article and applying it thereafter around the article.

The present invention further relates to a device for banding textile articles with labels, having a receiving unit for receiving the goods, a label feeding unit for supplying labels, and means for applying a label around the articles.

Banding of articles, such as socks, with labels has been known for many years.

Generally, it is a problem with this process to apply the labels tightly around the articles to be banded, depending on their shape.

There have been known different methods and devices for carrying out this process, all of which are, however, complex or do not, on the other hand, lead to a satisfactory banding result because the labels do not enclose the articles with the desired tightness.

The invention thus has for its object to provide a method and a device for banding articles with labels, which permit the articles to be reliably banded, with the labels in sufficiently tight contact, and this as simply and with as little cost as possible.

SUMMARY OF THE INVENTION

This object is achieved with a method of the kind described above by the fact that the article is longitudinally stretched in the receiving unit, whereafter the label is applied to and around the article.

The object is further achieved by a device where a receiving unit is provided for receiving the article, which comprises gripper elements, movable one relative to the other, for gripping the article at its two outer lengthwise ends and for stretching the article in its lengthwise direction, and which further comprises a label feeding unit for supplying a label to a central area of the article, between its two ends, in a direction perpendicular to the longitudinal direction of the article, and means for applying the label around the article and for fixing the ends of the label.

The method and the device according to the invention achieve an especially tight application of the label as it is wrapped around the article for banding. The essential reason for this is seen in the fact that the article is stretched in longitudinal direction before the label is applied around the article.

This label may be closed by gluing together the two ends of the label.

In addition, or alternatively, a self-adhesive label, that sticks to the article, may be used.

Preferably, the article placed in the receiving unit is gripped, and stretched, by its two outer ends in lengthwise direction, outside the area around which the label is wrapped later.

For wrapping the label around the article, after the latter has been gripped and stretched, different options are available.

On the one hand, it is possible to use an arrangement with two pivoted brackets, with a strap guided over each of them, so that when the outer ends of the brackets are pivoted around the article, the label comes to slide along the respective strap and is applied closely around the article.

By kinematically reversing that process, it is instead possible to approach a label to the article after the latter has been stretched, to bring it into contact with the article, and to then rotate the article about its longitudinal axis so that the label is wrapped around the circumference of the article.

According to a preferred further development of the device according to the invention, the receiving unit comprises upper and lower gripper elements or beams, with the lower beams forming the receiving unit, the upper and lower beams, which serve to compress or release the article in vertical direction, being movable one relative to the other, and a telescope feeder being provided for laterally supplying the articles.

It is possible in this way to feed the article into the receiving unit in a simple way, while simultaneously ensuring especially tight banding of the articles, due to the fact that they are compressed prior to the banding process.

According to a further development of the invention, there is provided, in addition to the first bracket, a second upwardly open bracket that can be pivoted, with an outer end of a second leg, about an outer end of a first leg, around the article and in upward direction opposite to the pivoting direction of the first bracket, while on the other side of the article the other side of the label slides along a second strap fixed to the outer end of the second leg and guided under tension over the outer end of the first leg, for being brought into contact with the article.

This feature allows the label to be applied on the article from both of its sides in an especially tight manner and to thus achieve complete closing of the banding.

To the extent banding is effected using self-adhesive labels, no additional step is required thereafter for closing the banding. But if instead normal labels are to be used, then the band can be closed by application of an adhesive strip or the like.

According to a further embodiment of the invention, the first and the second brackets exhibit concave, preferably substantially U-shaped cross-sections, the first and the second legs being respectively connected one with the other via a connecting leg and both straps extending in substantially horizontally direction in an initial position, before the brackets are pivoted in upward direction.

By shaping and arranging the brackets and straps in this way, an optimally intimate contact is achieved between the label and the article during the pivoting movement of the bracket around the article.

According to a further embodiment of the invention, a suction unit is provided between the two brackets for holding a label in the feeding position.

It is ensured in this way, with simple means, that the label is firmly held while it is wrapped around the article during the pivoting movement of the respective bracket.

According to an additional further development of the invention, the straps are made from a material with good sliding properties, preferably from Teflon.

This feature supports the sliding-off motion of the label and of the article on the straps, in order to ensure smooth operation. In this connection, Teflon has been found to be a sufficiently flexible and especially effective sliding material, which is of particular advantage when the article is a textile article.

According to a further embodiment of the invention, the label feeding means comprises a first roller on one side of the slide for supporting adhesive labels held on a carrier film, and a second roller on a second side of the slide for winding up the carrier film, the carrier film being brought into contact with the slide on the first side, guided around that end of the slide that faces the receiving unit, and being then guided to the second roller on the second side.

A label feeding means of that kind allows adhesive labels to be brought into, and to be positioned in a location below the articles in a simple way using a movable slide.

According to a convenient further development of the invention, the first and the second straps are tensioned by respective spring elements.

This permits the necessary tension of the straps to be produced by simple means.

It is understood that the features mentioned above and those yet to be explained below can be used not only in the respective combinations indicated, but also in other combinations or in isolation, without leaving the context of the present invention.

The invention will be described in more detail and explained below with reference to certain selected exemplifying embodiments.

DESCRIPTION OF THE PREFERRED EMBODIMENTS

Figure 1:
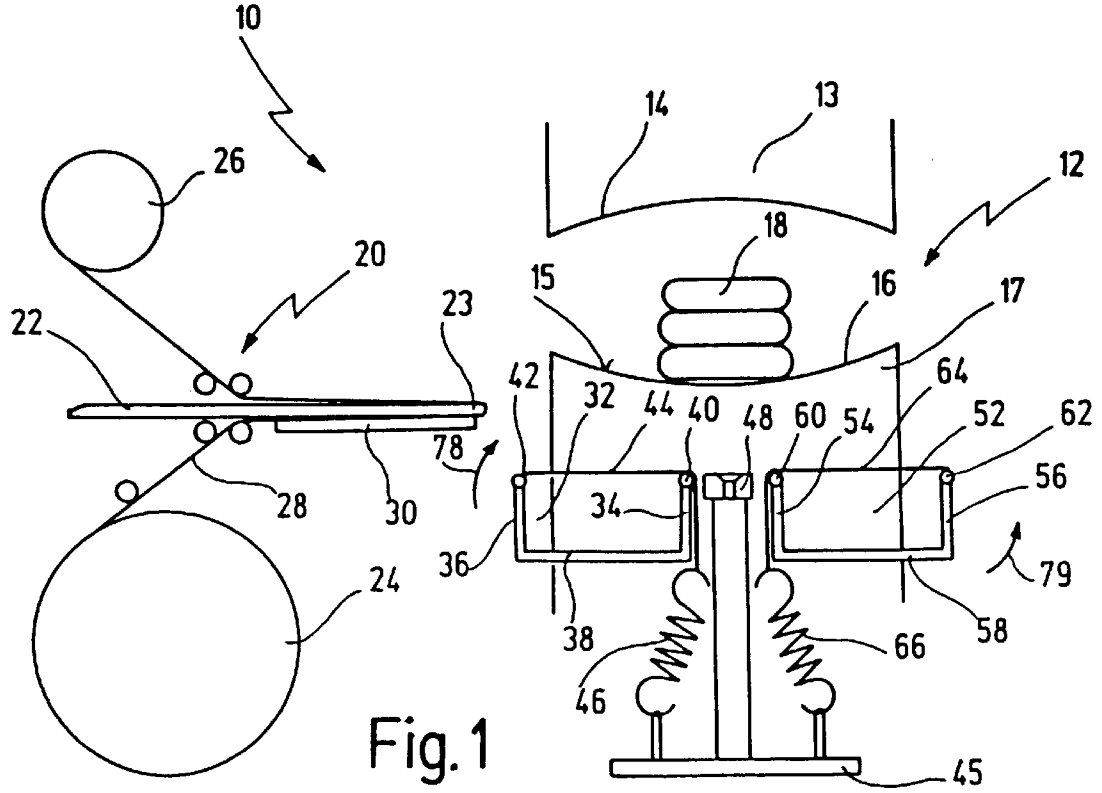
FIG. 1 shows a diagrammatic representation of a device according to the invention in a phase prior to the feeding of a label.

In FIG. 1, a device according to the embodiment is indicated generally by reference numeral 10. The device 10 comprises a receiving unit 12, consisting of two upper beams 13, 14, arranged one behind the other, and two lower beams 16, 17, arranged one behind the other, that can be moved in vertical direction, with the lower beams 16, 18 comprising a surface that serves as supporting surface 15 for an article 18. The article 18 may, for example, consist of socks, for example men's socks. Below the supporting surface 15, in the position indicated in FIG. 1, there are provided two upwardly open brackets 32, 52, with U-shaped cross-section, with a suction unit 48 arranged between them.

The first bracket 32 comprises a first leg 34 and a second leg 36, connected by an intermediate leg 38. The first leg 34 has an outer end 40 about which the bracket 32 can be pivoted in clockwise direction as indicated by arrow 78. The second leg 36 of the first bracket 32 has an outer end 42, which has fastened to it a wide Teflon strap 44 that is guided about the outer end 40 of the first leg 34 and is fixed at its lower end on the machine frame 45 by means of a spring element 46. In the position illustrated in FIG. 1, the first bracket 32 occupies its initial position in which the strap 44 forms a horizontal surface.

The second bracket is likewise provided with a strap 64 and arranged to pivot, though in counterclockwise direction, as indicated by arrow 79. The second bracket 52 comprises a first leg 54 with an outer end 60 about which the bracket 52 can be pivoted. The first leg 54 is connected, via an intermediate leg 58, with a second leg 56 having an outer end 62 to which the strap 64 is fixed, which latter is then guided about the outer end 60 and has its lower end fixed on the machine frame 45 via a spring element 66. In the initial position illustrated in FIG. 1 the two straps 44, 64 form horizontal, mutually aligned surfaces, only interrupted by the suction unit 48 arranged between them. Both straps 44, 64 consist of a plastic material with particularly good sliding properties, such as Teflon.

Located beside the receiving unit 12 is a label feeding unit indicated generally by reference numeral 20. The label feeding unit 20 comprises a horizontally arranged slide 22 that can be moved toward the receiving unit 12 into a position below the article 18 and above the horizontal supporting surfaces of the straps 44, 64. Starting from a lower roller 24, a carrier film 28 is brought into contact in a suitable way, by means of guide rollers, with the lower surface of the slide 22, is then guided around its forward end 23 and then guided on the upper surface of the slide 22, again in a suitable way and by means of guide rollers, onto an upper roller 26 that serves to wind up the carrier film 28. The carrier film 28 carries adhesive labels 30, which are depicted in FIG. 1 and in the following Figures with a notably exaggerated material thickness, this however only for the sake of clarity.

Further, the length of the adhesive label does not necessarily correspond to the circumference of the respective article in the drawing so that it might be necessary, depending on the particular case, to select a correspondingly greater length. This does not, however, alter the basic principle of the invention.

The article 18, resting in FIG. 1 on the surface 15 of the lower beam 16, has been supplied to this position by a telescope belt that can be moved in a plane offset by 90° from the plane of drawing of FIG. 1, as will be described hereafter in more detail with reference to FIG. 4.

Figure 2:
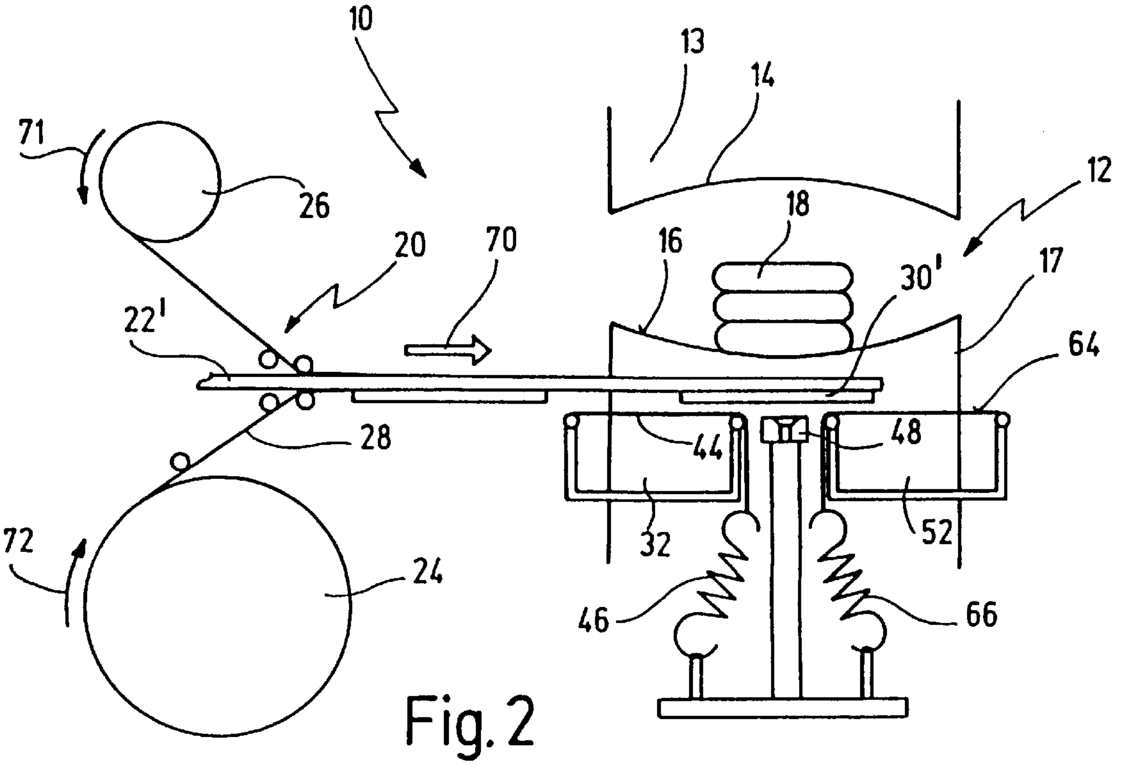
FIG. 2 shows the device according to FIG. 1 in a subsequent phase in which a label is transported into a feeding position below the article, by advancing a slide.

The next phase of the banding operation is illustrated in FIG. 2. In this phase, the slide of the receiving unit 20 is moved in the direction of arrow 70 toward the receiving unit 12 until the position 22' of the slide has been reached, in which the label held on the carrier film 28 occupies a position 30' directly below the article 18 and above the suction unit 48, approximately at the center of the latter. During this movement, the rollers 24, 26 move in the direction indicated by arrows 72, 71.

Figure 3:
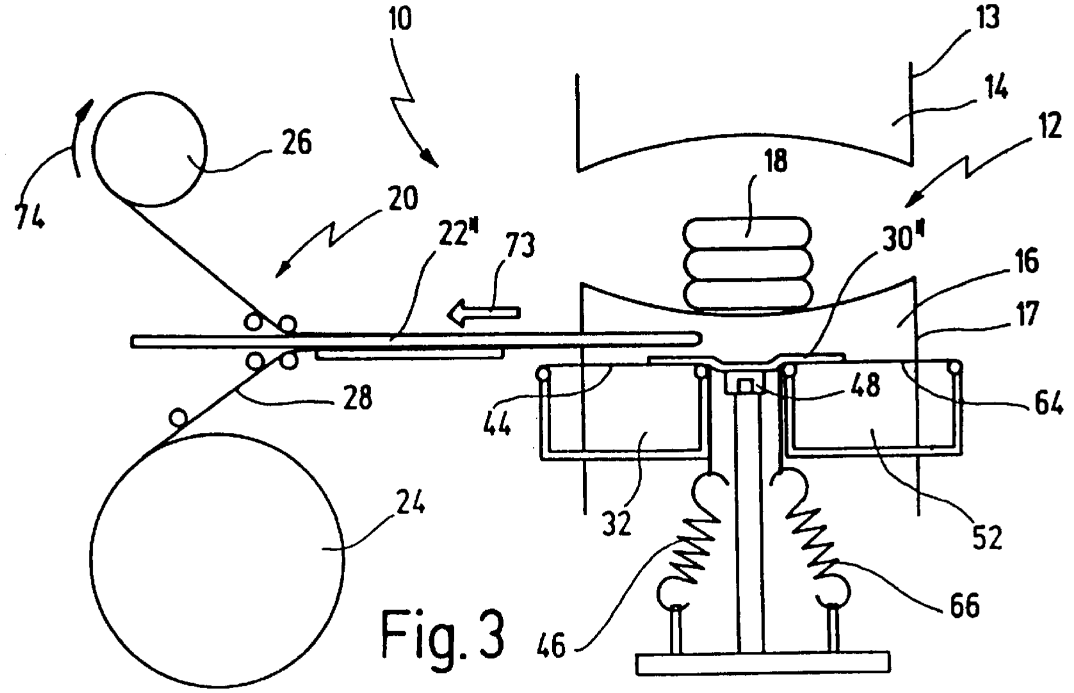
FIG. 3 shows a device according to FIG. 1 in a subsequent phase in which the slide is returned again, after a label has been moved into the feeding position.

The next phase of the banding operation is illustrated in FIG. 3. During this phase, the suction unit 48 is activated so that the center of the label comes to rest against the suction unit 48 and is retained by the latter with its ends resting on the straps 44, 64, whereby the position 30" is obtained that constitutes a suitable feeding position for the subsequent operation of wrapping the ends of the label around the article 18.

During this operation, the slide is additionally withdrawn from the receiving unit 12, in the direction of arrow 73, during which step the lower roller 24 is braked, and the upper roller 26 is allowed to wind up in the direction of arrow 74, so that the carrier film 28 is wound up on the upper roller 26 during withdrawal of the slide 22' in the direction of arrow 73.

Figure 4:
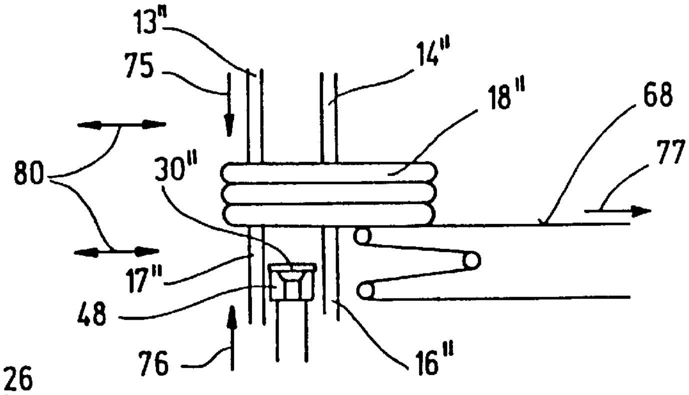
FIG. 4 shows a side view of the device according to FIGS. 1 to 3, in the area of the beam serving to hold and position the article, in a subsequent phase in which the two beams are moved together in order to compress the article and at the same time to drive a telescope belt, that serves for feeding the articles, in reverse direction in order to stretch the article prior to the subsequent banding operation.

FIG. 4 illustrates the next phase of the operation, showing only the article in the area of the beam and in a position turned by 90° relative to the plane of FIGS. 1 to 3. The beams have been moved together, in the direction of arrows 75, 76, so that the position of the beams indicated by 13", 14" and 16", 17", as shown in FIG. 4, has been obtained, with the article 18", having been supplied by a telescope belt 86, being somewhat compressed. After completion of the banding process, the telescope belt 68 can be withdrawn in the direction of the arrow before a new article is supplied.

After the upper and the lower beams have been moved together in vertical direction, one upper beam 13" and one lower beam 17", being displaceable in horizontal direction, now move relative to the respective other upper beam 14" and lower beam 16", as indicated by the double arrows 80, thereby additionally stretching the article so that the article assumes the position and shape indicated generally by reference numeral 18".

Figure 5:
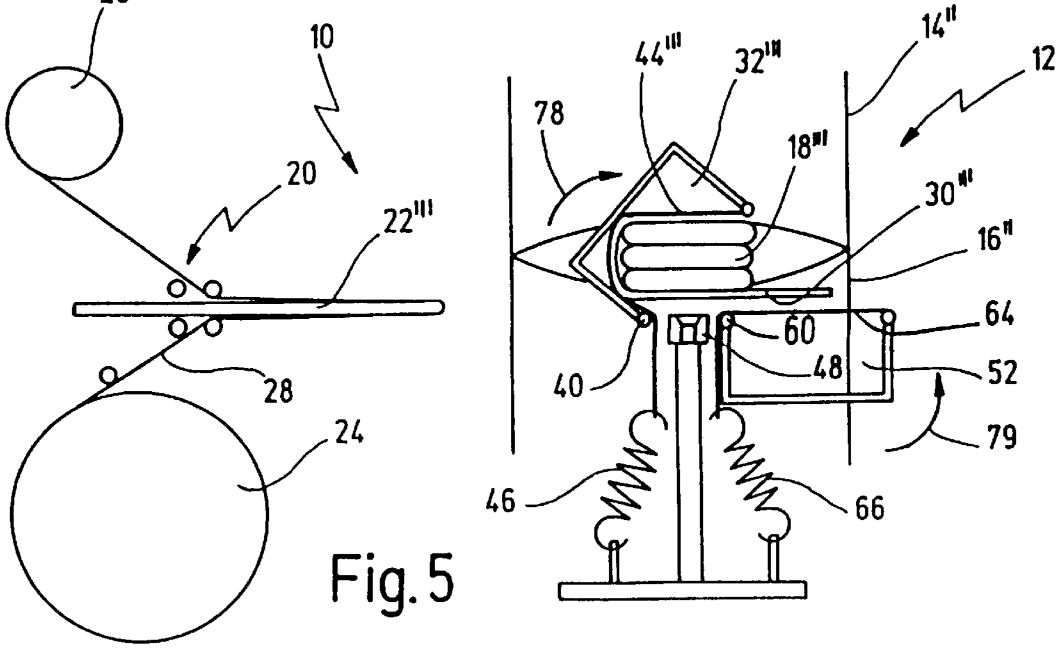
FIG. 5 shows the device according to FIGS. 1 to 4 in a phase following the compression and stretching of the article, in which the banding operation as such is performed.

FIG. 5 finally illustrates the banding process as such. During this operation, the slide of the label feeding unit 20 assumes again its withdrawn position 22'", corresponding to the initial position of the slide 22 shown in FIG. 1.

The beams 13", 14", 16", 17" are now as before in their advanced position in which the article 18'" is compressed and held between the beams.

From FIG. 5 it appears that now the first bracket has been pivoted in clockwise direction, as indicated by arrow 78, about the outer end 40 of the first leg, whereby the strap has been guided along the outer contour of the article 18'", and simultaneously the adhesive label has been wrapped tightly around the article 18'", so that the position of the adhesive label indicated by 30'" in FIG. 1 is obtained.

During the next phase, not illustrated in the drawing, the first strap is pivoted back from its position 32'" to its initial position whereas the second bracket 52 is pivoted upward, in counter-clockwise direction as indicated by arrow 79, in order to guide the other end of the adhesive label 30'" on the other side of the article 18'" to the top and to thereby close the banding.

After the beams 13", 14", 16", 17" have then been moved apart, the article is allowed to expand, which additionally tightens the banding.

In summary, a particularly tight banding can be produced in this way with simple means.

It is understood that instead of using adhesive labels, normal label may be used as well, in which case the banding could be closed by fastening a corresponding adhesive, applied from the top, on the ends of the label wrapped around the article.

By kinematically reversing the process described above, the article may also be gripped by its two lengthwise ends by means of tongue-like gripper elements applied from the outside, and be stretched in lengthwise direction. Thereafter, a label is supplied from the side, for example in the form of an adhesive label, and is then fixed, by one of its ends, to the central area of the article between its two ends, whereafter the article is turned about its longitudinal axis so that the label is wrapped around the surface of the article from the outside. Once the article is released from the gripper element, it contracts again with the result that particularly tight banding is achieved.

What is claimed is:

1. A method for banding elastic articles with labels, comprising the steps of:

feeding the article into a receiving unit;

holding the article in the receiving unit and stretching it in its longitudinal direction;

feeding the label to the article;

wrapping the label around the article;

fixing the ends of the label.

2. The method as defined in claim 1, wherein the label is glued together by its two ends to form a closed banding.

3. The method as defined in claim 1, wherein a self-adhesive label is used that sticks to the article.

4. The method as defined in claim 1, wherein the article placed in the receiving unit is gripped, and stretched, by its two outer ends in lengthwise direction, outside the area around which the label is wrapped later.

5. A method for banding textile articles with labels, comprising the steps of:

feeding the article into a receiving unit;

holding the article in the receiving unit by its two outer lengthwise ends;

feeding the label to the article;

wrapping the label around the article in a central area between its two ends;

fixing the ends of the label.

6. The method as defined in claim 1, further comprising the steps of:

positioning the label with one of its ends on a first strap below the article, and with a second end on a second strap;

fixing a central area of the label, between its two ends, to the article;

pivoting the first strap around the article in clockwise direction, about a pivot axis extending substantially parallel to the longitudinal axis of the article, in order to wrap the first end of the label tightly around the article, by causing the first end of the label so slide off along the first strap;

pivoting the second strap around the article in counter-clockwise direction, about a pivot axis extending substantially parallel to the longitudinal axis of the article, in order to wrap the second end of the label tightly around the second side of the article, by causing the first end of the label to slide off along the second strap.

7. The method as defined in claim 6, further comprising the steps of:

positioning the label with a first end on a first strap below the article, and with a second end on a second strap;

pressing the central area of the label, between its two ends, against the article;

pivoting the first strap around the article in clockwise direction, about a pivot axis extending substantially parallel to the longitudinal axis of the article, in order to wrap the first end of the label tightly around the article, by causing the first end of the label so slide off along the first strap;

pivoting the second strap around the article in counter-clockwise direction, about a pivot axis extending substantially parallel to the longitudinal axis of the article, in order to wrap the second end of the label tightly around the second side of the article, by causing the first end of the label to slide off along the second strap.

8. The method as defined in claim 7, wherein the first strap is held on a first outer end of a first bracket during the pivoting movement around the article, while the first band slides along the second end of the first bracket, forming the pivot axis, under tension applied thereon in order to thereby wrap the first end of the label in clockwise direction tightly around the article.

9. The method as defined in claim 7, wherein the second strap is held on a first outer end of a second bracket during the pivoting movement around the article, while the second band slides along the second end of the second bracket, forming the pivot axis, under tension applied thereon in order to thereby wrap the second end of the label in counter-clockwise direction tightly around the article.

10. The method as defined in claim 8, wherein a first bracket having a concave cross-section is used for pivoting the first strap.

11. The method as defined in claim 10, wherein a first bracket having a substantially U-shaped cross-section is used for pivoting the first strap.

12. The method as defined in claim 9, wherein a second bracket having a concave cross-section is used for pivoting the second strap.

13. The method as defined in claim 12, wherein a second bracket having a substantially U-shaped cross-section is used for pivoting the second strap.

14. A method for banding elastic articles with labels, comprising the steps of:

feeding the article into a receiving unit;

holding the article in the receiving unit and stretching the article;

feeding the label to the article and gluing one end of the label to the article;

turning the article about its longitudinal axis, in order to tightly wrap the label around the article under tension;

fixing the ends of the label.

15. The method as defined in claim 14, wherein the article placed in the receiving unit is gripped, and stretched, by its two outer ends in lengthwise direction, outside the area around which the label is wrapped later.

16. A device for banding elastic articles with labels, comprising:

a receiving unit for receiving the articles, said receiving unit having gripper elements, movable one relative to the other, for gripping the article at its two outer lengthwise ends and for stretching the article in its lengthwise direction;

a label feeding unit for supplying a label to a central area of the article, between its two ends, in a direction perpendicular to the longitudinal direction of the article;

means for applying the label around the article and for fixing the ends of the label.

17. The device as defined in claim 16, further comprising:

a first strap and a second strap being arranged one behind the other in one horizontal plane;

a first bracket having a first outer end to which one end of the first strap is fixed, and a second end by which it can pivot about a first pivot axis, the first strap having its second end guided and stretched over the second end of the first bracket;

a second bracket having a first outer end to which one end of the second strap is fixed, and a second end by which it can pivot about a second pivot axis extending in parallel to the first pivot axis, the second strap having its second end guided and stretched over the second end of the first bracket;

a feeding unit for feeding the article into a position above the first and second straps and for transferring it to the gripper elements;

the label feeding unit being designed to feed a label to the two straps to a position above the two second ends of the two brackets.

18. The device as defined in claim 17, wherein a space is provided between the first and the second straps, within which a vertically movable ram is provided for pressing the label against the article from below.

19. The device as defined in claim 18, wherein the ram can be subjected to the action of compressed air.

20. The device as defined in claim 17, wherein the first bracket has a concave cross-section.

21. The device as defined in claim 20, wherein the first bracket has a substantially U-shaped cross-section.

22. The device as defined in claim 17, wherein the second bracket has a concave cross-section.

23. The device as defined in claim 22, wherein the second bracket has a substantially U-shaped cross-section.

24. The device as defined in claim 17, wherein the first and the second brackets consist of a plastic material with good sliding properties.

25. The device as defined in claim 17, wherein the first and the second brackets are tensioned over the second ends of the brackets by means of spring elements.

* * * * *